(12) United States Patent　　(10) Patent No.: US 8,375,690 B2
LaFargue et al.　　(45) Date of Patent: Feb. 19, 2013

(54) POLLEN HARVESTING MACHINE

(75) Inventors: Marianne LaFargue, Paris (FR); Vincent Nicolas, Vanves (FR)

(73) Assignee: Stallergenes S.A., Antony Cedex (FR)

( * ) Notice: Subject to any disclaimer, the term of this patent is extended or adjusted under 35 U.S.C. 154(b) by 0 days.

(21) Appl. No.: 12/845,920

(22) Filed: Jul. 29, 2010

(65) Prior Publication Data

US 2011/0023432 A1　　Feb. 3, 2011

Related U.S. Application Data

(60) Provisional application No. 61/231,495, filed on Aug. 5, 2009.

(30) Foreign Application Priority Data

Jul. 31, 2009　(FR) ..................................... 09 55410

(51) Int. Cl.
*A01D 46/00* (2006.01)

(52) U.S. Cl. ........................................................ 56/13.1

(58) Field of Classification Search ............... 56/1, 12.9, 56/13.1, 16.4 R, 16.5, 16.6, 30–32, 126, DIG. 8
See application file for complete search history.

(56) References Cited

U.S. PATENT DOCUMENTS

| 1,969,104 | A | * | 8/1934 | Sibley et al. ................... 62/267 |
| 2,046,932 | A | * | 7/1936 | Wyatt et al. .................... 56/13.2 |
| 2,471,326 | A | * | 5/1949 | Hoyt, Sr. ....................... 209/722 |
| 2,593,625 | A | * | 4/1952 | Stokes ......................... 56/328.1 |
| 2,721,655 | A | * | 10/1955 | Pritchett ......................... 209/21 |
| 2,827,749 | A | * | 3/1958 | Patten ............................ 56/128 |
| 3,686,889 | A | * | 8/1972 | Harza .............................. 62/62 |
| 3,986,463 | A | * | 10/1976 | Houston et al. ............... 111/200 |
| 4,922,651 | A | * | 5/1990 | Atkinson et al. .............. 47/1.41 |
| 5,694,700 | A |  | 12/1997 | Greaves et al. |
| 6,121,014 | A |  | 9/2000 | Koziel et al. |
| 6,982,326 | B1 | * | 1/2006 | Griffith et al. ............... 536/23.6 |
| 7,181,896 | B2 |  | 2/2007 | Lukac et al. |
| 7,402,667 | B2 |  | 7/2008 | Cook et al. |
| 2006/0053686 | A1 | * | 3/2006 | Halwas ......................... 47/1.41 |

FOREIGN PATENT DOCUMENTS

| DE | 34 07517 | 1/1986 |
| FR | 1388298 | 2/1965 |
| FR | 2 881 649 | 8/2006 |

OTHER PUBLICATIONS

Preliminary Search Report issued Mar. 11, 2010 for FR 0955408, National Institute of Industrial Property (INPI), Paris, Cedex, France.

(Continued)

*Primary Examiner* — Thomas B Will
*Assistant Examiner* — Mai Nguyen
(74) *Attorney, Agent, or Firm* — Stites & Harbison PLLC; Marvin Petry

(57) ABSTRACT

A pollen harvesting machine having a motorized chassis on which there are mounted heads for harvesting pollen by suction, which heads are connected by a suction circuit to a separation cyclone, which is connected to a suction fan. The separation cyclone is associated with a pollen recovery hopper. Each head comprises an assembly of a suction hood which has a generally frustroconical portion, which widens between an upper opening which is connected to the remainder of the suction circuits of the machine, and a polygonal base.

10 Claims, 3 Drawing Sheets

OTHER PUBLICATIONS

Written Opinion issued Jul. 31, 2009 for FR 0955408, National Institute of Industrial Property (INPI), Paris, Cedex, France, with computer generated English translation of Point V thereof.
Preliminary French Search Report issued Mar. 4, 2010 for FR 0955411, National Institute of Industrial Property (INPI), Paris, Cedex, France.
Written Opinion issued Jul. 31, 2009 for FR 0955411, National Institute of Industrial Property (INPI), Paris, Cedex, France, with Computer generated English translation of Point V thereof.
Preliminary French Search Report for FR 0955410, Mar. 4, 2010.

* cited by examiner

POLLEN HARVESTING MACHINE

CROSS-REFERNECE TO RELATED APPLICATIONS

This application claims benefit of U.S. Provisional Application No. 61/231,495, filed Aug. 5, 2009 (which is hereby incorporated by reference).

The present invention relates to a pollen harvesting machine.

In the prior art, there already exist harvesting machines of this type which comprise a motorised chassis on which there are mounted various means including means which are in the form of a head for harvesting pollen by suction and which are connected via means in the form of a separation cyclone to means which form a suction fan.

These various means are connected by an assembly of ventilation ducts and the means in the form of a separation cyclone are associated with means in the form of a pollen recovery hopper.

In the prior art, it has already been proposed to produce a harvesting machine of this type on which there are provided two suction circuits in parallel which each comprise means in the form of a suction fan and means in the form of a separation cyclone, these being connected by means of ducts and connectors to pollen harvesting heads which are arranged in the form of a ramp placed at the front of the machine.

This ramp is carried, for example, by a fork which can be adjusted in terms of height to adapt to the height of the species to be harvested and whose angle relative to the ground can also be adjusted.

This ramp can be produced in conventional manner in the form of a plurality of portions which can be folded in order to allow this machine to travel on roads.

These means both allow the pollen to be separated from the plants and the pollen to be recovered by means of suction.

However, the use of such a machine has revealed some problems.

Problems have occurred concerning efficiency of suction, agglomeration of the harvested pollen and fermentation thereof.

The harvesting of pollen is mainly carried out in summer under high temperature conditions. Nonetheless, the pollen collected is very damp and exposure to these high temperatures during harvesting time leads to an agglomeration of pollen which makes the recovery of the pollen very difficult. With existing harvesting machines, it is estimated that the pollen, which is then processed for the extraction of allergens, represents approximately only 5% of the total volume collected.

In addition to this problem of agglomeration, there is a problem with fermentation which is also linked to the high temperatures at the time of harvesting, which results in a reduction in the allergenic activity of the pollen collected and an undesirable increase of the microbiological flora (bacteria, yeasts, moulds) in the product collected. Since the pollen is used for the extraction of allergens which are then intended for the preparation of anti-allergy medication or diagnostic tests, the microbiological load of the product must remain lower than the maximum load defined by the European Pharmacopoeia.

An object of the invention is therefore to solve these problems.

To this end, the invention relates to a pollen harvesting machine, of the type comprising a motorised chassis on which there are mounted means which are in the form of a head for harvesting pollen by means of suction and which are connected, via means in the form of a separation cyclone, to means which form a suction fan, the means in the form of a cyclone being associated with means in the form of a pollen recovery hopper, characterised in that the means in the form of a pollen harvesting head comprise an assembly of suction hoods which each have a first generally frustoconical portion which widens between an opening for connection to the remainder of the circuits of the machine and a polygonal base.

According to other aspects of the invention, the pollen harvesting machine comprises one or more of the following features:

- the polygonal base is square,
- the suction hoods are arranged in the form of a suction ramp which is carried by a fork which can be adjusted in terms of position, height and tilt, and which is fixed to the front of the machine,
- it comprises two parallel suction circuits, one of which is connected to the hoods of the left-hand portion and the other of which is connected to the hoods of the right-hand portion of the suction ramp, these circuits each comprising means in the form of a separation cyclone, means forming a suction fan and means in the form of a pollen recovery hopper,
- it comprises means for freezing the harvested pollen in the means in the form of a recovery hopper,
- the means in the form of a recovery hopper comprise an actual hopper around which thermal insulation is arranged,
- the means in the form of a hopper comprise a flap for introducing dry ice therein,
- the means in the form of a hopper comprise means for introducing liquid nitrogen therein, and
- the base of the means in the form of a pollen recovery hopper comprises a flap for emptying and collecting the frozen pollen.

The invention will be better understood from a reading of the following description, which is given purely by way of example and with reference to the appended drawings, in which:

FIG. 1 illustrates a pollen harvesting machine which is generally designated 1.

This machine comprises, for example, a motorised chassis of an appropriate type, at the front of which there is arranged a fork, shown diagrammatically at 2 for supporting a ramp 3 of heads for harvesting pollen by means of suction.

These heads will be described in greater detail below and the ramp can be adjusted in terms of position, that is to say, in terms of height and tilt.

Figure 1:
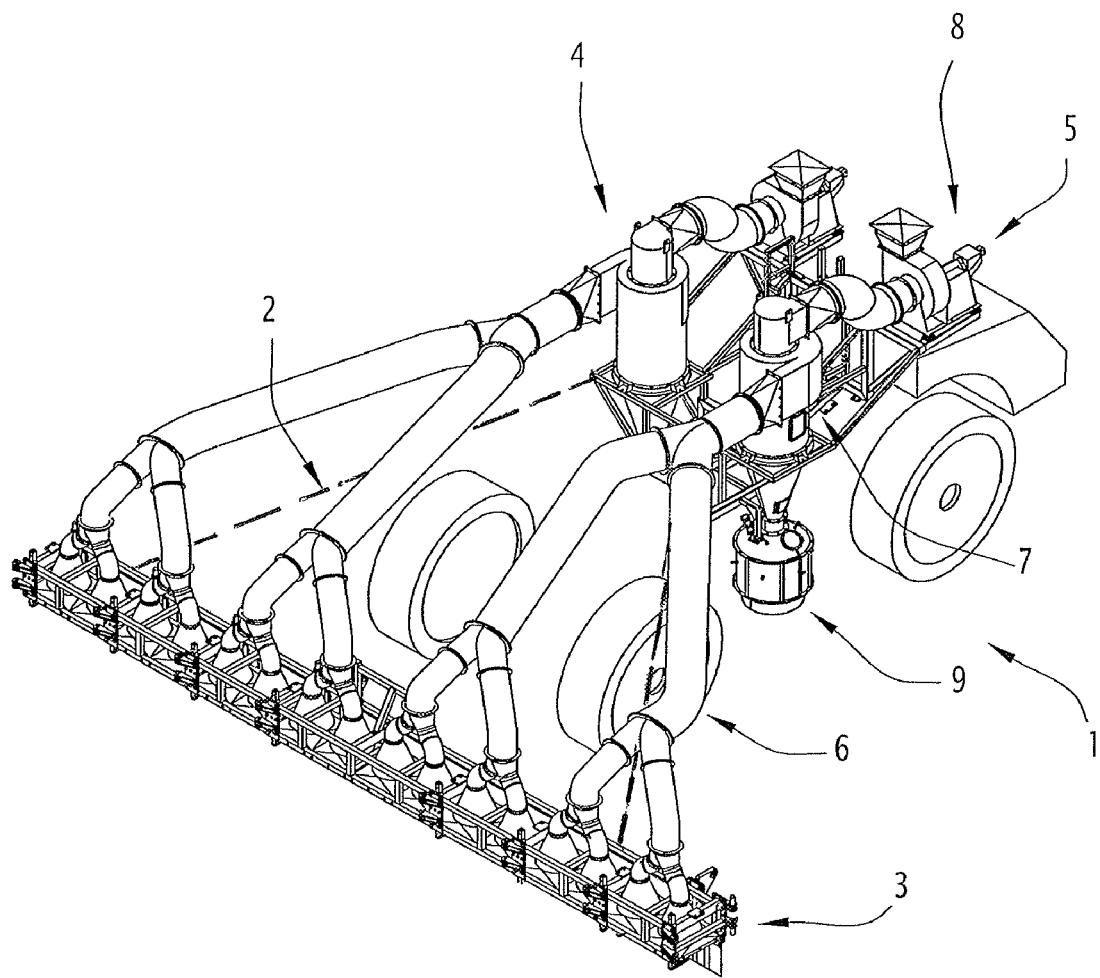
FIG. 1 is a schematic diagram illustrating the structure of a machine according to the invention.

The corresponding heads of the ramp placed at the left and right thereof are connected to parallel suction circuits which are generally designated 4 and 5, respectively, in this FIG. 1.

Each circuit such as, for example, the circuit 5 comprises an assembly of connection ducts, such as, for example, a duct which is generally designated 6 and which allows the corresponding suction heads to be connected to corresponding means in the form of a separation cyclone generally designated 7.

These means 7 in the form of a separation cyclone are placed in the intermediate portion of the machine and are themselves connected by means of ducts to means which are in the form of a suction fan and which are generally designated 8 and placed at the rear of the machine.

By way of example, these means in the form of a fan may have an output of 6000 m$^3$/hour for a rotation speed, for example, of 2400 rpm. Each ventilation means controls the suction over one half of the ramp 3 of suction heads.

The motors of the ventilation means may, for example, be formed by hydraulic motors which are supplied with power from a source of energy which is provided on the chassis. The suction speeds may also be adjustable from a cabin of the chassis independently for each fan.

It is possible to use an electrically controlled proportional valve to adjust the hydraulic flow in the motors and therefore to control the rotation speed thereof.

The drawn-in flow of air thus generated is transferred from the ramp of suction heads to the fans by an assembly of flexible ventilation ducts. This assembly of ducts is optimised in order to prevent pollen from being deposited on the walls. The lengths of the ducts are optimised and the potential retention zones are minimised.

This assembly can be completely disassembled and cleaned in order to allow, for example, ducts to be changed between each species of pollen harvested.

Such an assembly allows an air intake speed of greater than 15 m/second, for example, to be achieved at the top of each suction head.

The means 7 in the form of a separation cyclone themselves allow the drawn-in particles to be separated, that is to say, the pollen plus various debris, from the flow of drawn-in air. These particles are then recovered in means in the form of a recovery hopper which are associated with these means in the form of a cyclone.

One of these means in the form of a recovery hopper is generally designated 9 in FIG. 1. The dimensions of the means in the form of a cyclone are optimised in order to allow separation of the pollen from the flow of air of close to 100%.

After separation, the pollen falls into the means in the form of a recovery hopper which, in the example illustrated, are placed under each means in the form of a cyclone at each side of the chassis of the machine.

In the embodiment illustrated, the suction ramp 3 comprises eight suction heads which are connected by means of ducts and connectors corresponding to one of the suction circuits described above.

Figure 2:
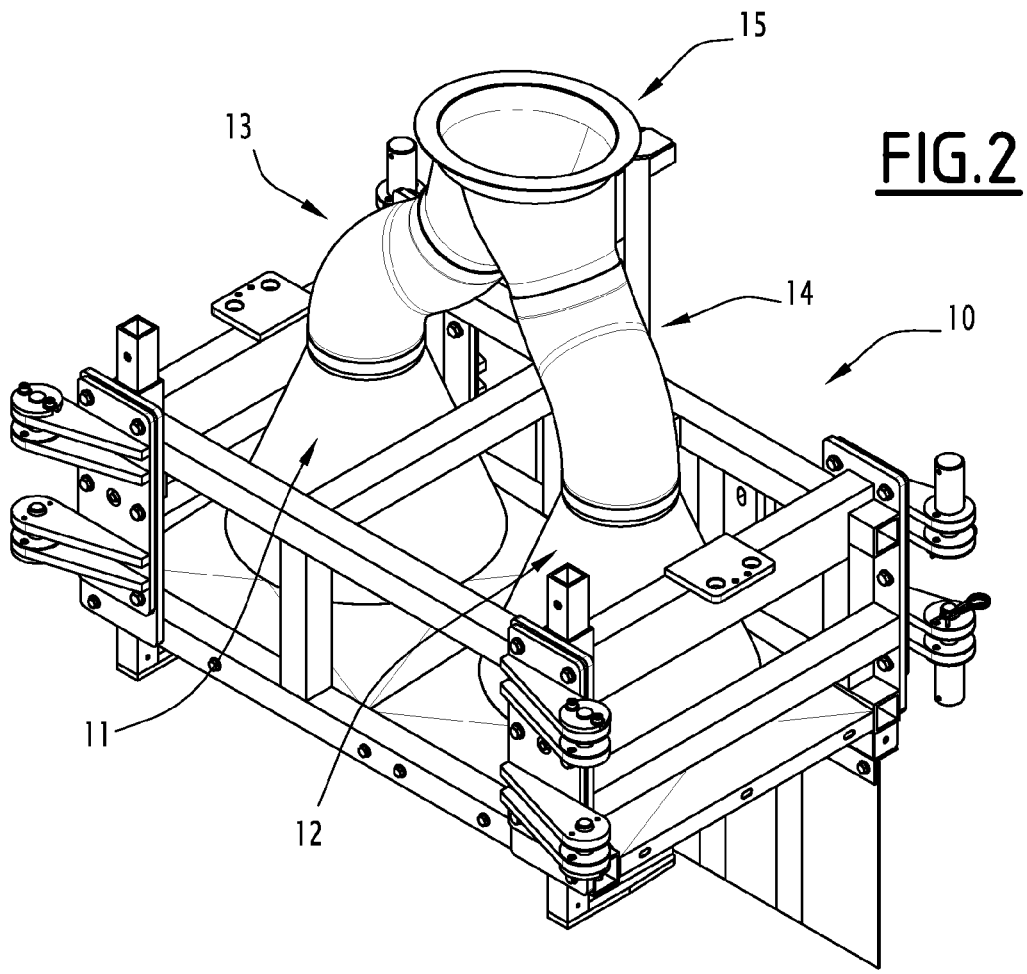
FIG. 2 illustrates a suction head involved in the constitution of such a machine.

One of these suction heads is illustrated in greater detail in FIG. 2.

This head is generally designated 10 and comprises in the example illustrated two suction hoods 11 and 12, respectively, which are associated with each other and positioned side by side.

Each hood has an open end which is connected via a respective duct 13 and 14 to a connector 15, the connector itself being branched off from one of the suction circuits described above, such as circuit 5.

The configuration of the hoods has been optimised with respect to ventilation in order to allow a minimal suction speed over the greatest possible surface-area thereof.

Figure 3:
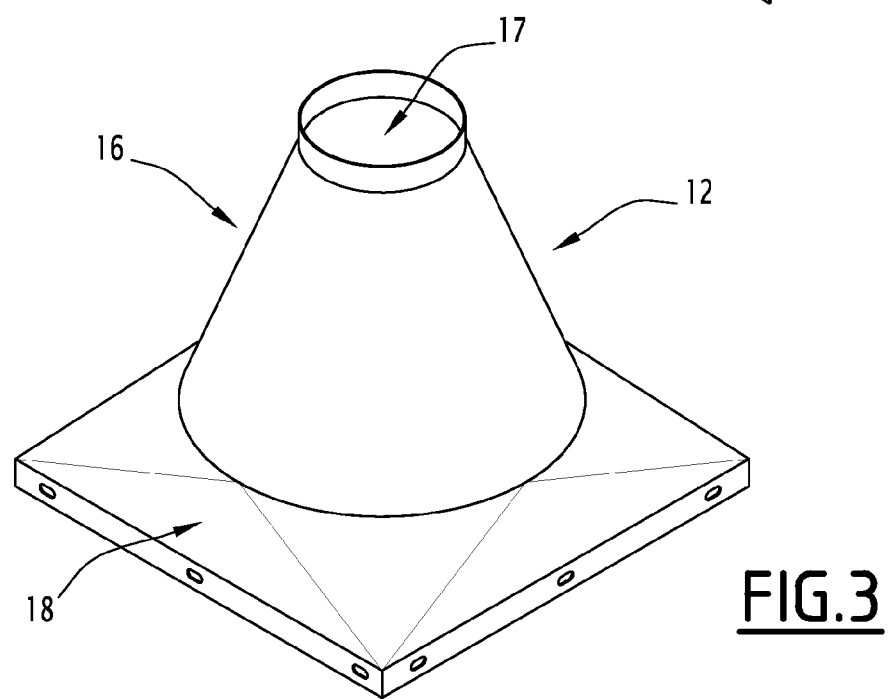
FIG. 3 illustrates a suction hood involved in the constitution of such a head.

Such a hood is illustrated in greater detail in FIG. 3.

This hood is, for example, the hood generally designated 12 and it comprises a frustoconical portion which is generally designated 16 and which extends so as to widen between an opening 17 for connection, for example, to the duct 14 and a polygonal base 18 which is, for example, square.

With the values given above, there is obtained with such a shape a suction speed which is greater than 1 m/second over more than 75% of the surface-area of the hood and in particular the base thereof.

This has allowed the problems set out above to be overcome with regard to the efficiency of the suction means of the prior art.

Furthermore, and in order to further improve the efficiency of these suction heads, means, such as, for example, cables, can be placed in a horizontal manner in front of the hoods, these means being adjustable in terms of position in order to shake the plants when the machine passes, in order to further optimise the release of pollen by the plants.

Figure 4:
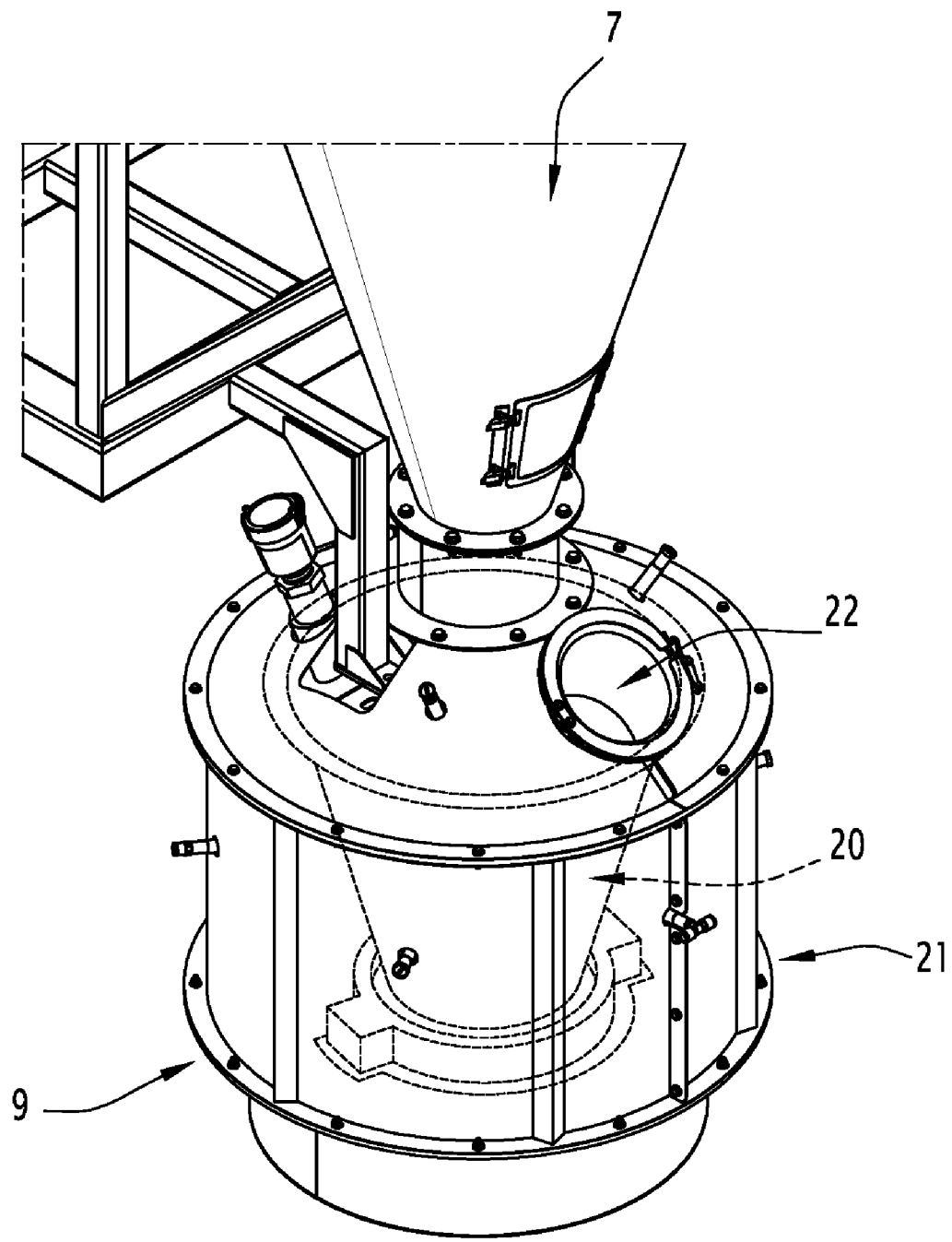
FIG. 4 illustrates the means in the form of a pollen recovery hopper involved in the constitution of such a machine.

FIG. 4 illustrates an embodiment of means in the form of a pollen recovery hopper.

As indicated above, pollen recovery means, such as, for example, the means generally designated 9, are placed below the corresponding means in the form of a cyclone, such as, for example, the means 7.

In the machine according to the invention, these pollen recovery means comprise an actual hopper which is generally designated 20 around which there is placed thermal insulation which is generally designated 21.

At the upper end thereof, this hopper 20 is connected to the cyclone 7 and comprises, for example, a flap 22 which allows dry ice to be introduced into the hopper in order to bring about instantaneous freezing of the harvested pollen.

The inner side of the hopper is preferably kept at a temperature of less than −20° C.

The introduction of this dry ice into the hopper can be carried out, for example, by an operator.

Of course, it is self-evident that other embodiments of these means for freezing pollen can be envisaged.

In this manner, for example, means for introducing liquid nitrogen may also be provided.

Other means can also be envisaged.

It should also be noted that the base of the hopper 20 can be provided with means for recovering the pollen frozen in this manner.

Various embodiments of these means may be envisaged, such as, for example, cartridge-type means, drawer-type means, etc.

It should also be noted that the recovery hopper 20 may, for example, be provided with means which form a temperature sensor and means which form a level detector, whose output information is transmitted, for example, into the cabin of the machine in order, for example, to allow an operator to ensure that the pollen harvested is frozen and that the hopper is not full, in order to take corrective action as necessary, such as, for example, adding dry ice or emptying the hoppers, in order to recover the pollen.

It has been found that the operation for freezing the pollen allowed the problems set out above of agglomeration and fermentation of the pollen to be overcome.

In the hopper, the pollen is in the form of a frozen powder, which remains in this form for the entire duration of the harvesting operation. After the harvest is complete, the frozen pollen can then be recovered and dried by means of lyophilisation in order to provide a dry powder of pollen grains. In this manner, with the machine according to the invention, the quantity of pollen which can then be used for the extraction of allergens consequently represents up to 85% of the total volume collected.

Furthermore, the microbiological development within the product is blocked by the freezing of the product.

It has also been found that the allergenic activity of the pollen collected using the machine according to the invention is greater than that of a pollen collected in a hopper without any freezing means. Without wishing to be bound by a hypothesis, the freezing could limit the degradation of the allergens in the pollen owing to the exposure to heat, or the water present in the product collected could extract the allergens from the pollen, the transfer of allergens to the water being blocked by the freezing.

The pollen collected may be grass pollen, herbaceous plant pollen, but also tree pollen, such as the pollens of cocksfoot, meadow cat's tail grass, vernal grass, rye grass, meadow grass, ambrosia, artemisia, pellitory-of-the-wall, plantain, ash, olive, oak, plane, birch, cypress, juniper, thuja, cedar.

The invention claimed is:

1. A pollen harvesting machine comprising:

a motorized chassis, a ramp operatively connected to the chassis, a plurality of harvesting heads, the ramp comprising a mounting structure to which all of the plurality of harvesting heads are fixedly mounted, each harvesting head having an inlet fixed to the ramp and a frustoconical suction hood narrowing upwardly from the inlet opening, the ramp being adjustable in terms of position, height and tilt to thus also simultaneously adjust all of the plurality of heads fixed thereon to optimize the position, height and tilt of the heads for the plants and the pollen to be recovered from the plants, the upper ends of the frustoconical suction hoods being connected to ducts of a suction circuit for carrying away the pollen, the ducts being connected to a separation cyclone positioned to receive the pollen directly from the heads, and a suction fan positioned downstream from the separation cyclone so as to exert suction to draw the pollen from the heads, through the ducts and into the separation cyclone, the separation cyclone and the suction fan being constructed to separate out the pollen particles and direct them downwardly and permit the drawn-in air, essentially free of pollen particles, to continue to the suction fan, and a recovery hopper positioned below the separation cyclone to collect the pollen particles separated out by the separation cyclone.

2. A pollen harvesting machine according to claim 1, comprising a structure to freeze the harvested pollen in the recovery hopper.

3. A pollen harvesting machine according to claim 2, including a thermal insulation around the recovery hopper.

4. A pollen harvesting machine according to claim 3, wherein the hopper comprises a flap for introducing dry ice therein.

5. A pollen harvesting machine according to claim 4, wherein the hopper includes an access opening for introducing liquid nitrogen therein.

6. A pollen harvesting machine according to claim 1, wherein a fork operatively connects the front of the machine to the suction ramp.

7. A pollen harvesting machine according to claim 1, wherein the plurality of harvesting heads are divided into two groups, a right group and a left group, each group connected to a separate suction circuit, each suction circuit comprising its own separation cyclone, suction fan and recovery hopper.

8. A pollen harvesting machine according to claim 7, wherein each of the right and left suction circuits comprise four harvesting heads which are all operatively connected to a single duct which communicates with the separation cyclone and the suction fan of that suction circuit.

9. A pollen harvesting machine according to claim 1, wherein the inlets affixed to the head are polygonal.

10. A pollen harvesting machine according to claim 9, wherein the polygonal heads are square.

* * * * *